J. W. LITTLEFIELD & H. T. SHERIDAN.
SPRING SEATS.
No. 184,533.                               Patented Nov. 21, 1876.
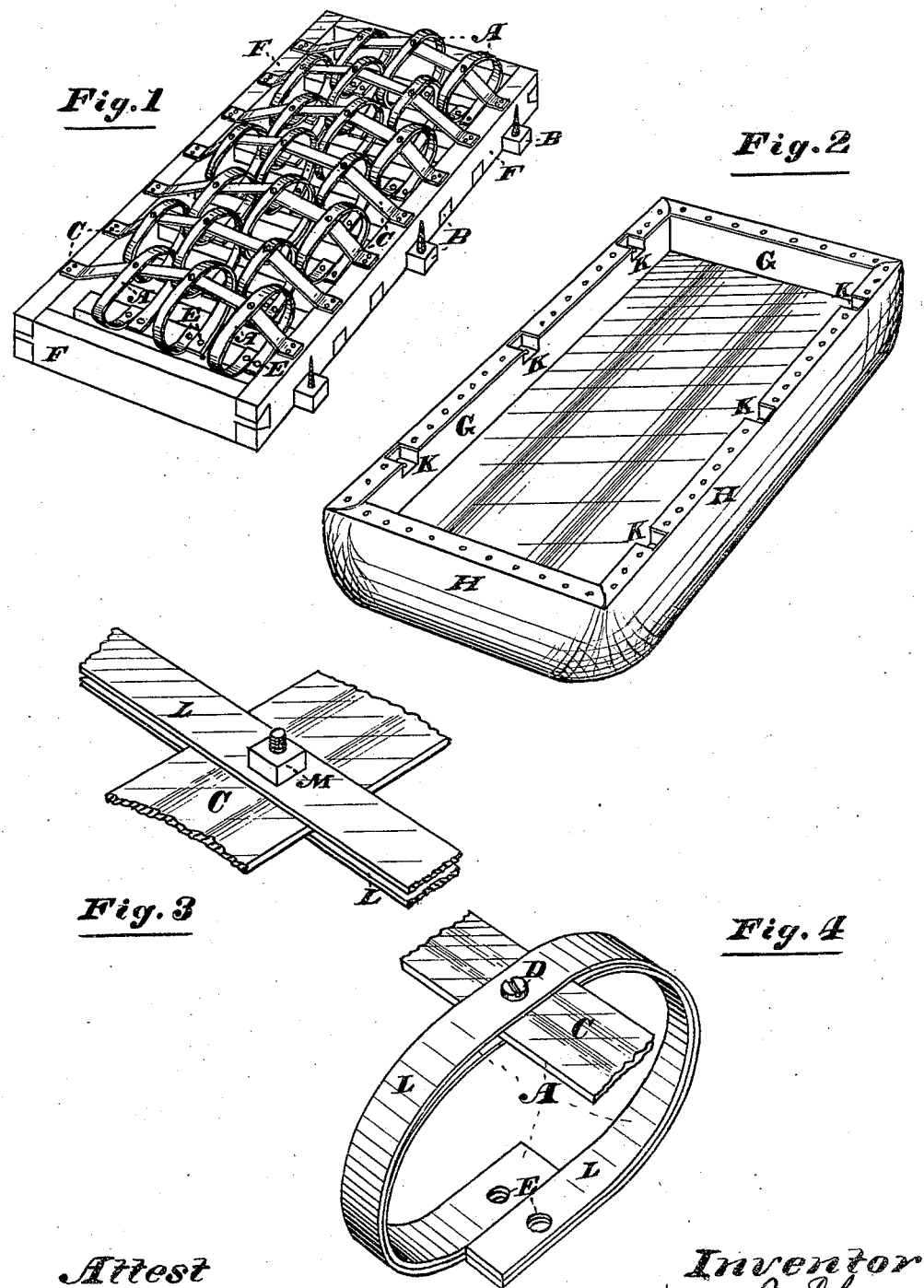

UNITED STATES PATENT OFFICE.

JOSEPH W. LITTLEFIELD AND HARRY T. SHERIDAN, OF CHICAGO, ILLINOIS.

IMPROVEMENT IN SPRING-SEATS.

Specification forming part of Letters Patent No. 184,533, dated November 21, 1876; application filed August 21, 1876.

*To all whom it may concern:*

Be it known that we, JOSEPH W. LITTLEFIELD and HARRY T. SHERIDAN, of the city of Chicago, in the county of Cook and State of Illinois, have invented a new and useful Improvement in Spring-Seats, which improvement is fully set forth in the following specification, reference being had to the accompanying drawings.

The object of this invention is to construct a seat that may be used as a car-seat, a chair-seat, sofa-seat, or in any place where a spring-seat is desired. The adjustability and detachability of the inside frame, from the upholstered outside frame, permits easy access to the springs and other parts, for the purpose of repair, or other purposes.

Figure 1 is the adjustable inside frame of our improved seat. Fig. 2 is the upholstered outside frame of our improved spring-seat, and fits down over the frame shown in Fig. 1, and is the upholstered or cushioned part of the complete seat. Fig. 4 shows the form of spring used in the seat. Fig. 3 shows a section of the spring A before it is coiled, as shown in Fig. 4, and shows more fully its construction.

The spring A is composed of two or more strips, L, of steel bolted together by the screw-bolt D, with a strip of canvas, C, intervening between two of the strips. The strip of canvas C is placed at right angles to the strips of steel, and is held in place and is secured to the strips of steel L by the screw-bolt D, or its equivalent. The screw-bolt D is made with a screw-head on one end and a thread on the other end, on which is screwed the nut M. This bolt D passes through the strips L and the intervening layer of canvas C, and is secured by the nut M. B, Fig. 1, are the cross-bars or slats of the inside frame, to which the ends of the spring A are secured by screws, the ends of the spring A not overlapping each other, but each end being screwed independently to the cross-bars B. The relative position of the ends of the spring A, when fastened to the cross-bar B, is fully shown in Figs. 1 and 4. E are screws fastening the ends of the spring A to the cross-bar B.

The strips of canvas C are connected with the entire series of springs on each cross-bar B, and are fastened to the sides F of the inside frame, Fig. 1. The strips of canvas C, with their ends fastened to the sides of the inside frame, act as a firm support for the series of springs on a cross-bar, B, and keep them from tipping or careening over. The slats B, to which the springs A are fastened, are fastened at their ends to the sides of the frame, Fig. 1. The ends of three of these slats project past the sides of the inside frame, and are screwed to the sides G of the outside frame, Fig. 2, in the notch or recess K, thus combining the two frames into one.

The outside frame, Fig. 2, is simply an upholstered frame made of such dimensions as to fit snugly over the inside frame, Fig. 1, and is fastened to the frame, as above described.

The upholstering of the outside frame rests on the springs of the inside-frame, forming a comfortable upholstered spring-seat.

What we claim as new and as our invention, and wish to secure by Letters Patent, is—

1. The combination of the spring A, consisting of the strips L, with the canvas C, bolt D, slat B, and frame F, the ends of the spring being placed side by side, and secured to the slat B, all substantially in the manner and for the purpose set forth.

2. The combination of the inner spring-frame with the outer upholstered frame, the projecting ends of the cross-slats B of the inner frame being secured in the recesses K of the outer frame, substantially as and for the purpose set forth.

JOS. W. LITTLEFIELD.
H. T. SHERIDAN.

Witnesses:
F. J. SEYBOLD,
ELHANAN J. SEARLE.